US008509838B2

(12) United States Patent
Lee et al.

(10) Patent No.: US 8,509,838 B2
(45) Date of Patent: Aug. 13, 2013

(54) USER EQUIPMENT APPARATUS FOR SIMULTANEOUSLY TRANSMITTING SIGNALS VIA A PLURALITY OF WIRELESS COMMUNICATION CHIPS TO WHICH DIFFERENT WIRELESS COMMUNICATION SCHEMES ARE APPLIED AND METHOD FOR CONTROLLING TRANSMISSION POWER THEREOF

(75) Inventors: Youngseob Lee, Incheon (KR); Sangjo Park, Seoul (KR); Soonik Kwun, Seoul (KR); Yongnam Whang, Uiwang-si (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 13/078,892

(22) Filed: Apr. 1, 2011

(65) Prior Publication Data
US 2011/0263216 A1 Oct. 27, 2011

Related U.S. Application Data

(60) Provisional application No. 61/332,820, filed on May 10, 2010, provisional application No. 61/320,327, filed on Apr. 2, 2010.

(30) Foreign Application Priority Data

Dec. 6, 2010 (KR) ........................ 10-2010-0123361

(51) Int. Cl.
*H04B 1/04* (2006.01)
*H04B 17/00* (2006.01)
*H04B 7/00* (2006.01)
*H04B 7/185* (2006.01)
*H03C 1/62* (2006.01)
*H04K 1/02* (2006.01)
*H04L 25/03* (2006.01)
*H04L 25/49* (2006.01)

(52) U.S. Cl.
USPC ..................... 455/522; 455/114.2; 455/115.1; 370/318; 375/296

(58) Field of Classification Search
USPC .............. 455/522, 63.1, 67.11, 550.1, 553.1, 455/570, 101, 102, 114.2, 115.1; 370/318; 375/296
See application file for complete search history.

(56) References Cited

U.S. PATENT DOCUMENTS 6,061,568 A * 5/2000 Dent .............................. 455/450
7,046,694 B2 * 5/2006 Kumar ........................... 370/487
(Continued)

FOREIGN PATENT DOCUMENTS
CN 101232488 7/2008

OTHER PUBLICATIONS

The State Intellectual Property Office of the People's Republic of China Application Serial No. 201110087537.2, Office Action dated May 17, 2013, 7 pages.

*Primary Examiner* — Andrew Wendell
(74) *Attorney, Agent, or Firm* — Lee, Hong, Degerman, Kang & Waimey

(57) ABSTRACT

A user equipment apparatus for simultaneously transmitting signals from a plurality of wireless communication chips to which different wireless communication schemes are applied and a method for controlling a transmission power control of the user equipment apparatus are disclosed. The user equipment apparatus comprises a transmission mode decision module determining whether the user equipment apparatus is currently operated to transmit a signal through one wireless communication chip or simultaneously transmit signals, to which different wireless communication schemes are applied, through a plurality of wireless communication chips, and an intermodulation distortion (IMD) effect decision module determining whether a set of frequencies of the signals respectively transmitted from the plurality of wireless communication chips causes intermodulation distortion (IMD).

18 Claims, 3 Drawing Sheets

(56) References Cited

U.S. PATENT DOCUMENTS

| | | |
|---|---|---|
| 7,970,360 B2 * | 6/2011 | Pei .............................. 455/114.3 |
| 2002/0016155 A1 | 2/2002 | Charbonnier |
| 2004/0048576 A1 * | 3/2004 | Hildebrand et al. ......... 455/67.3 |
| 2005/0163250 A1 | 7/2005 | McCallister |
| 2008/0137883 A1 * | 6/2008 | Araki ............................ 381/107 |
| 2008/0291830 A1 | 11/2008 | Pernu et al. |
| 2009/0061921 A1 * | 3/2009 | Eom et al. ..................... 455/522 |
| 2010/0291963 A1 * | 11/2010 | Patel et al. .................... 455/522 |

* cited by examiner

USER EQUIPMENT APPARATUS FOR SIMULTANEOUSLY TRANSMITTING SIGNALS VIA A PLURALITY OF WIRELESS COMMUNICATION CHIPS TO WHICH DIFFERENT WIRELESS COMMUNICATION SCHEMES ARE APPLIED AND METHOD FOR CONTROLLING TRANSMISSION POWER THEREOF

CROSS-REFERENCE TO RELATED APPLICATIONS

Pursuant to 35 U.S.C. §119, this application claims the benefit of earlier filing date and right of priority to Korean Application No. 10-2010-0123361, filed on Dec. 6, 2010, and also claims the benefit of U.S. Provisional Patent Application Ser. Nos. 61/332,820, filed on May 10, 2010, and 61/320,327, filed on Apr. 2, 2010, the contents of which are all hereby incorporated by reference herein in their entirety.

BACKGROUND OF THE INVENTION

1. Field of the Invention

The present invention relates to transmission power control of a user equipment apparatus, and more particularly to, transmission power control of a user equipment apparatus for simultaneously transmitting signals from a plurality of wireless communication chips to which different wireless communication schemes are applied.

2. Discussion of the Related Art

With breakthrough of the wireless communication technology, demand on the electric wave increases, and the electric wave is widely used in the field of medical service and traffic, and daily life as well as the field of communication and broadcasting. With the increase of electronic and electric devices, the electromagnetic wave radiated from electric wave facilities and devices has greatly affected a human body. In particular, federal communication commission (FCC) of the US has adopted guidelines on environmental impact assessment of radio frequency radiation of FCC 96-326 to prescribe a limit of local power absorption, which will be applied to a random portable transmitting device.

The limit of maximum allowable exposure prescribed in the guidelines is based on exposure assessment criterion quantified by a specific absorption rate (SAR) rule that is the standard of a radio frequency (RF) energy absorption rate. If the electromagnetic wave is radiated towards a human body, quantitative assessment on the electromagnetic wave is performed by SAR measurement through animal test, power measurement and analysis of electromagnetic fields, wherein the SAR is represented by absorption power per unit mass, which is absorbed in the human body by exposure of the human body to the electromagnetic fields.

In addition to the FCC of the US, CENELEC of the Europe has prescribed the SAR condition as requirements of conformity assessment of a mobile communication terminal. Although there is the difference in reference values of the electromagnetic wave SAR rule, the FCC of the US and the CENELEC of the Europe prescribe the SAR condition as an important guideline of conformity assessment of the mobile communication terminal. Accordingly, the mobile communication terminal should satisfy the SAR condition (or rule).

The most general method for satisfying the SAR value is that the mobile communication terminal is located far away from the human body if possible. If signals should be transmitted simultaneously through a plurality of frequency bands as suggested in the present invention, it is general that two antennas are used. In this case, the SAR value may not satisfy the prescribed value due to restriction of the location of the antennas.

Accordingly, if the antennas are located at a place the farthest away from the human body and RF front end is designed to simultaneously transmit signals to one antenna through a plurality of frequency bands, the most optimized SAR value can be obtained. Hereinafter, a solution for satisfying the SAR condition and solving the problem of intermodulation distortion (IMD) will be described. In this specification, band 2, band 5 and band 13 correspond to different frequency bands.

The limit of maximum allowable exposure prescribed in the guidelines is based on exposure assessment criterion quantified by a specific absorption rate (SAR) rule that is the standard of a radio frequency (RF) energy absorption rate. If the electromagnetic wave is radiated towards a human body, quantitative assessment on the electromagnetic wave is performed by SAR measurement through animal test, power measurement and analysis of electromagnetic fields, wherein the SAR is represented by absorption power per unit mass, which is absorbed in the human body by exposure of the human body to the electromagnetic fields.

In addition to the FCC of the US, CENELEC of the Europe has prescribed the SAR condition as requirements of conformity assessment of a mobile communication terminal. Although there is the difference in reference values of the electromagnetic wave SAR rule, the FCC of the US or the CENELEC of the Europe prescribe the SAR condition as an important guideline of conformity assessment of the mobile communication terminal. Accordingly, the mobile communication terminal should satisfy the SAR condition (or rule).

Generally, in a wireless communication system, a user equipment should follow the SAR rule even if it simultaneously transmits signals through two or more frequency bands. In other words, if the user equipment simultaneously transmits signals from a plurality of wireless communication chips to which different wireless communication schemes are applied, it may exceed the SAR standard. In addition to the problem of the SAR standard, interference occurs between the signals, which are simultaneously transmitted, due to intermodulation distortion (IMD) (also referred to as IM3). For this reason, a problem occurs in that communication throughput is remarkably deteriorated.

However, detailed solutions for the problems of the SAR standard and the IMD have not been suggested until now.

SUMMARY OF THE INVENTION

Accordingly, the present invention is directed to a user equipment apparatus for simultaneously transmitting signals from a plurality of wireless communication chips to which different wireless communication schemes are applied and a method for controlling transmission power thereof, which substantially obviate one or more problems due to limitations and disadvantages of the related art.

An object of the present invention is to provide a user equipment (UE) apparatus for simultaneously transmitting signals from a plurality of wireless communication chips to which different wireless communication schemes are applied.

Another object of the present invention is to provide a method for controlling a transmission power at a user equipment, which can simultaneously transmitting signals from a plurality of wireless communication chips to which different wireless communication schemes are applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a user equipment (UE) apparatus according to the present invention comprises a transmission mode decision module determining whether the user equipment apparatus is currently operated to transmit a signal through one wireless communication chip or simultaneously transmit signals, to which different wireless communication schemes are applied, through a plurality of wireless communication chips, and an intermodulation distortion (IMD) effect decision module determining whether a set of frequencies of the signals respectively transmitted from the plurality of wireless communication chips causes intermodulation distortion (IMD).

Preferably, if the set of the frequencies causes intermodulation distortion, the user equipment apparatus further comprises a first transmission power control module performing a power back-off as much as a value preset for a transmission power of the signal to be transmitted from the wireless communication chip having a lowest priority among the plurality of wireless communication chips.

Preferably, the user equipment apparatus further comprises a sensing module determining whether the user equipment apparatus has approached near the ear of a user at a preset distance or less. The sensing module determines whether the user equipment apparatus is approached near the ear of the user at a preset distance or less, based on whether one of a hands free function, a speaker phone, Bluetooth acoustic device and earphone is currently used by the user equipment apparatus, or based on distance information measured between the user equipment apparatus and the user.

Preferably, the user equipment apparatus further comprises a specific absorption rate (SAR) condition decision module determining whether transmission power values of the signals simultaneously transmitted from the plurality of wireless communication chips satisfy the SAR condition which is predefined, wherein the transmission power values of the signals are determined based on the power back-off performed by the first transmission power control module.

Preferably, the user equipment apparatus further comprises a second transmission power control module performing power back-off for the transmission power value of the signal, which will be transmitted from the wireless communication chip having a lowest priority among the plurality of wireless communication chips, to satisfy the SAR condition, if the transmission power values do not satisfy the SAR condition.

Preferably, the user equipment apparatus further comprises a transmitting module simultaneously transmitting the signals of the plurality of wireless communication chips based on the power value determined in accordance with the power back-off performed by the first transmission power control module, if the transmission power values satisfy the SAR condition.

Selectively, the user equipment apparatus further comprises a transmitting module simultaneously transmitting the signals of the plurality of wireless communication chips based on the power value determined in accordance with power back-off performed by the second transmission power control module.

In another aspect of the present invention, a method for controlling a transmission power at a user equipment (UE) comprises determining a transmission mode whether the user equipment is currently operated to transmit a signal through one wireless communication chip or simultaneously transmit signals, to which different wireless communication schemes are applied, through a plurality of wireless communication chips, and an intermodulation distortion (IMD) effect decision step for determining whether a set of frequencies of the signals respectively transmitted from the plurality of wireless communication chips causes intermodulation distortion if the determined transmission mode is the mode that simultaneously transmits the signals through the plurality of wireless communication chips.

Preferably, if the set of the frequencies causes intermodulation distortion, the method further comprises a first transmission power controlling for performing a power back-off as much as a value preset for a transmission power of the signal to be transmitted from the wireless communication chip having a lowest priority among the plurality of wireless communication chips.

Preferably, the method further comprises a sensing step for determining whether the user equipment apparatus is approached near the ear of a user at a preset distance or less. The sensing step determines whether the user equipment is approached near the ear of the user at a preset distance or less, based on whether one of a hands free function, a speaker phone, Bluetooth acoustic device and earphone is currently used by the user equipment apparatus, or based on distance information measured between the user equipment apparatus and the user.

Preferably, the method further comprises determining whether transmission power values of the signals simultaneously transmitted from the plurality of wireless communication chips satisfy a predefined specific absorption rate (SAR) condition, based on the power back-off performed by the first transmission power controlling.

Preferably, the method further comprises a second transmission power controlling for performing a power back-off for the transmission power value of the signal, which will be transmitted from the wireless communication chip having a lowest priority among the plurality of wireless communication chips, to satisfy the SAR condition, if the transmission power values do not satisfy the SAR condition.

Preferably, the method further comprises transmitting simultaneously the signals of the plurality of wireless communication chips based on the power value determined in accordance with the power back-off performed by the first transmission power controlling, if the transmission power values satisfy the SAR condition.

Selectively, the method further comprises transmitting simultaneously the signals of the plurality of wireless communication chips based on the power value determined in accordance with the power back-off performed by the second transmission power controlling.

In accordance with the user equipment and the method for controlling a transmission power of the user equipment according to the present invention, IMD, which may occur when signals are simultaneously transmitted from a plurality of wireless communication chips to which different wireless communication schemes are applied, can be removed, and the SAR condition can be satisfied, whereby communication throughput can be improved remarkably.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the description of the present invention, a user equipment (UE) designates a mobile or fixed type communication device used by a user, such as a mobile station (MS), an advanced mobile station (AMS), a mobile hand set, and like that. Also, a base station (BS) designates a random node that performs communication with the user equipment, and its examples include Node B, eNode B, an access point (AP), and like that.

In the present invention, "wireless communication scheme" may be referred to as various terminologies such as radio access technology (RAT). For example, examples of the wireless communication scheme or radio access technology scheme may include such as a code division multiple access (CDMA) scheme, a wideband code division multiple access (WCDMA) scheme and a long term evolution (LTE) scheme.

In the wireless communication system, the user equipment can receive a signal through a downlink, and can transmit a signal through an uplink. Examples of information transmitted from or received in the user equipment include data and various kinds of control information. Various physical channels are provided depending on types and purpose of use of the information transmitted from or received in the user equipment.

In this specification, a first wireless communication chip and a second wireless communication chip are intended to transmit signals through different wireless communication schemes or different radio access technology schemes. For example, the first wireless communication chip is intended to transmit a signal based on, but not limited to, a CDMA scheme while the second wireless communication chip is intended to transmit a signal based on, but not limited to, the LTE scheme.

Figure 1:
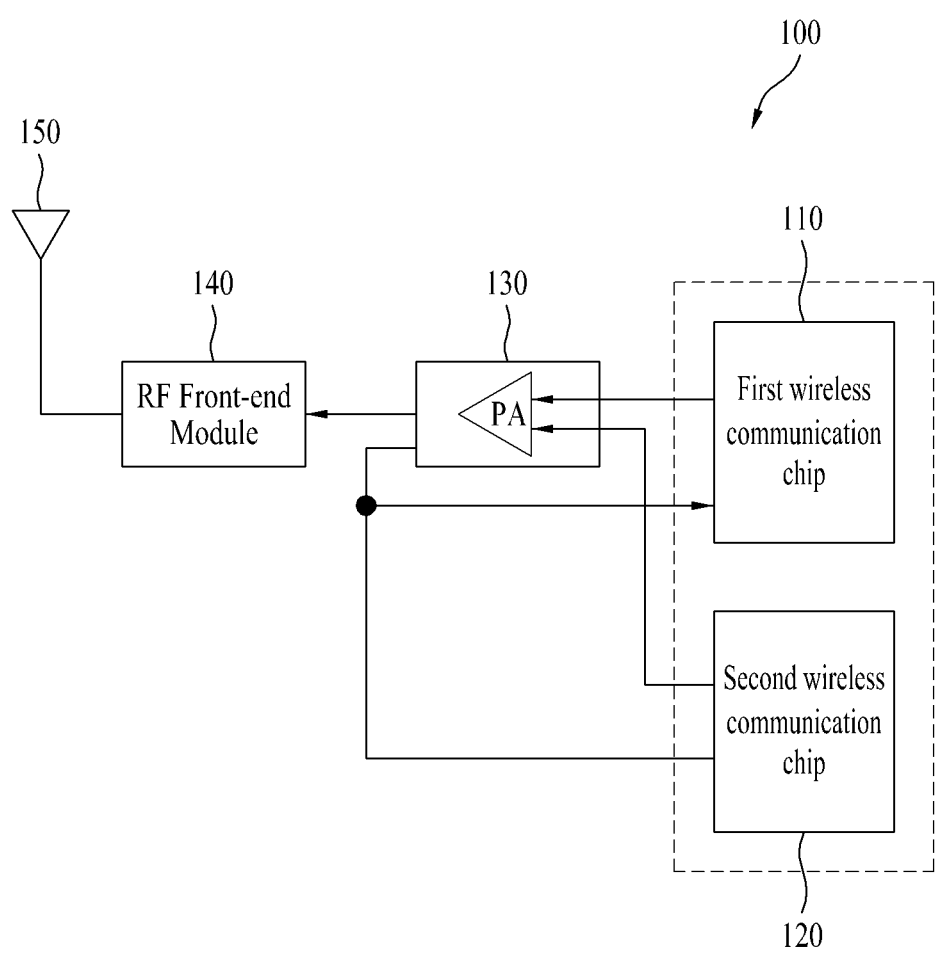
FIG. 1 is an exemplary of diagram configuration of a user equipment 100 according to the present invention.

FIG. 1 is an exemplary of diagram illustrating configuration of a user equipment (UE) 100 according to the present invention.

Referring to FIG. 1, the user equipment 100 may include a first wireless communication chip 110, a second wireless communication chip 120, a power amplifier 130, an RF front-end module 140, and an antenna 150.

A radio wave of a specific frequency band is used for wireless communication. The first and second wireless communication chips 110 and 120 modulate original signals (baseband signals) to high frequency band signals during signal transmission, and demodulate the received high frequency band signals to the baseband signals during signal reception. Each of the wireless communication chips 110 and 120 may be implemented as a "radio frequency (RF) chip" that modulates a signal processed at a baseband to a high frequency band signal, or may be implemented as "RF and baseband chip" where a baseband chip that processes a baseband signal is combined with an RF chip that modulates a signal processed at a baseband to a high frequency band signal or demodulates the received signal to a low frequency band signal during signal transmission and reception to process the modulated signal or the demodulated signal to the baseband signal.

Also, although the first and second wireless communication chips 110 and 120 may be provided as separate chips as illustrated in FIG. 1, they may be provided as one chip.

As described above, the first wireless communication chip 110 and the second wireless communication chip 120 process the original signal to the high frequency band signal during signal transmission, whereas they process the high frequency band signal to the baseband signal during signal reception. Also, the first wireless communication chip 110 and the second wireless communication chip 120 perform modulation/demodulation functions, respectively.

If the user equipment 100 needs to simultaneously transmit signals through a plurality of wireless communication chips 110 and 120 to which different wireless communication schemes are applied, the first wireless communication chip 110 processes the original signal to the first frequency band signal, and at the same time the second wireless communication chip 120 processes the original signal to the second frequency band signal. In other words, the user equipment 100 can transmit the signals by modulating the signals to different frequency band signals through the first and second wireless communication chips 110 and 120 during signal transmission. In general, when simultaneously transmitting the signals processed by the first and second wireless communication chips 110 and 120, the user equipment 100 can transmit the signals through different frequency bands.

An interface (not shown) is connected to exchange signals and information between the modules of the user equipment 100 as well as between the first wireless communication chip 110 and the second wireless communication chip 120.

The power amplifier (PA) 130 serves to amplify the signals respectively processed by (in particular, processed at different frequency bands) and received from the first wireless communication chip 110 and the second wireless communication chip 120.

The RF front-end module 140 can serve to freely perform signal transmission and reception of the user equipment 100 and enable communication under various environments. The RF front-end module 140 can split transmitting and receiving signals from each other by connecting the antenna 150, the first wireless communication chip 110 and the second wireless communication chip 120 with one another. The RF front-end module 140 includes a receiver front-end module having a receiving signal filter for filtering and amplification, and a transmitter front-end module having a power amplifier 130 amplifying a transmitting signal. The RF front-end module 140 can mainly be used for a TDMA type global system for mobile communications (GSM) user equipment that requires switching between a transmitting signal and a receiving signal during communication.

Also, the RF front-end module 140 can be used to transmit a signal through multiple frequency bands in the same manner as the user equipment 100 described in the present invention. For example, the RF front-end module 140 allows the user equipment 100 to simultaneously use the GSM system and the W-CDMA system. If the RF front-end module 140 is used, the number of parts of the user equipment 100 can be reduced, reliability of the user equipment 100 can be improved, and loss caused by interconnection between the parts can be reduced.

Also, the RF front-end module 140 remarkably reduces battery consumption by reducing power consumption, and enables miniaturization of the parts of the multi-functional user equipment of multiple frequency bands. As illustrated in FIG. 1, the RF front-end module 140 can transmit the signals received from the power amplifier 130 and processed at a plurality of frequency bands through the antenna 150.

The antenna 150 transmits the signals to the outside (for example, base station). Although one antenna is illustrated in FIG. 1, a plurality of antennas may exist in the user equipment 100.

Hereinafter, when the first wireless communication chip 110 and the second wireless communication chip 120 simultaneously transmit signals to which different wireless communication schemes are applied, a detailed configuration of the user equipment 100 that controls the power of the signals will be described.

Figure 2:
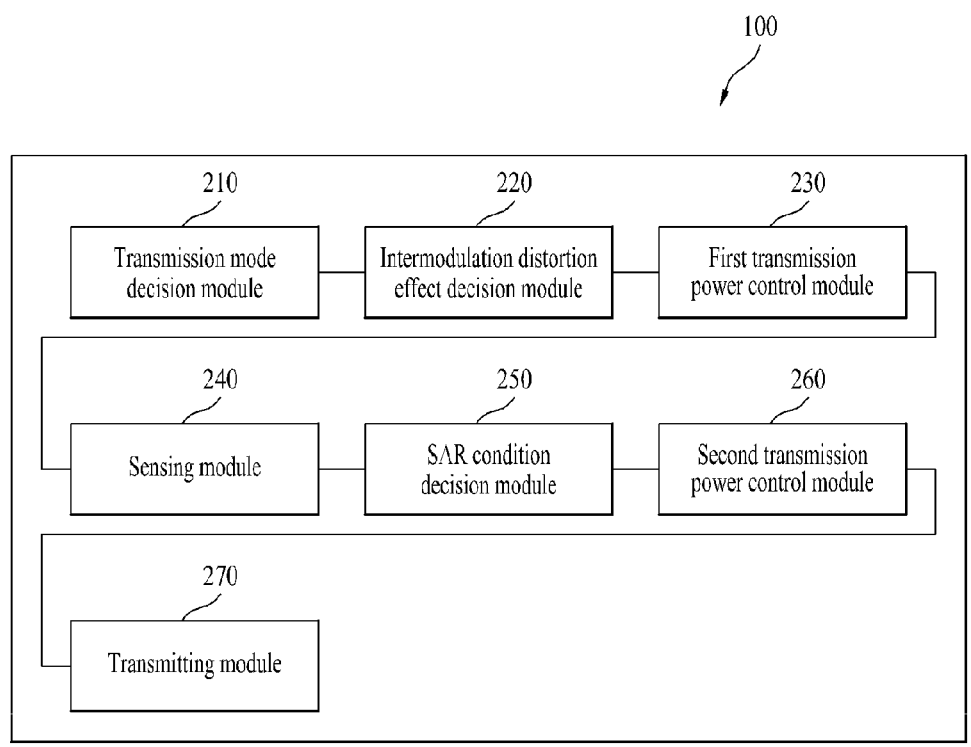
FIG. 2 is an exemplary of diagram illustrating configuration of a user equipment 100 that performs transmission power control in accordance with the present invention.

FIG. 2 is an exemplary of diagram illustrating configuration of a user equipment 100 that performs transmission power control in accordance with the present invention.

Referring to FIG. 2, the user equipment 100 may include a transmission mode decision module 210, an intermodulation distortion effect decision module 220, a first transmission power control module 230, a sensing module 240, an SAR condition decision module 250, a second transmission power control module 260, and a transmitting module 270.

The transmission mode decision module 210 determines whether the user equipment 100 is currently operated to transmit a signal through only one wireless communication chip (for example, first wireless communication chip 110) or simultaneously transmit signals, to which different wireless communication schemes are applied, through a plurality of wireless communication chips (for example, first and second wireless communication chips 110 and 120).

If it is determined that the transmission mode decision module 210 is operated to simultaneously transmit signals through a plurality of wireless communication chips 110 and 120, the intermodulation distortion effect decision module 220 determines whether frequencies of the signals respectively transmitted from the plurality of wireless communication chips affect intermodulation distortion (IMD).

Intermodulation distortion (IMD) is caused by intermodulation of a signal at an output end when two or more frequencies pass through a non-linear system or circuit. Namely, IMD means distortion due to intermodulation (IM) components. Unlike an analog system, in a digital system such as CDMA system, instead of using one frequency, i.e., one channel used by one signal, a wide channel bandwidth is shared by several signals. For this reason, IMD is important. In other words, since signals of several frequencies are simultaneously input to a system that processes one band, the signals of several frequencies are mixed at the output end, whereby signal processing may not be performed normally.

For example, supposing that two frequencies of f1 and f2 are provided, signals of several IM components are output but full multiple harmonics such as $2*f1$ and $3*f2$ can be filtered by the filter. However, third orders, such as $2*f1*f2$ and $2*f2*f1$, which correspond to signals closest to the signals f1 and f2, may cause a problem. IMD is mainly caused by these third order IM components. Accordingly, it is general that signals called IMD mean third order IMD. Since a third frequency component of IM, which is also expressed as IMD, should be removed generally, IM may be referred to as IM3.

In particular, third order IMD equationally increases to cube in accordance with the increase of input signals. Accordingly, although IMD first occurs at a small range, as the input signals are increased at a gradient faster than that of the original signal, IMD may occur similarly to the power of the original signal. When IMD is similar to the power of the original signal, it may be referred to as IP3.

As described above, IMD means a level of signal distortion due to intermodulation, and IP3 is used as option or measurement reference value of a real product. In a super heterodyne based on intermediate frequency (IF), since the third order of intermodulation is closest to the original signal, it is important that third IM should be removed. Accordingly, it is preferable that signal distortion such as IMD and interference are reduced.

If the intermodulation distortion effect decision module 220 determines that set of frequencies of the signals respectively transmitted from the plurality of wireless communication chips at the same time causes (or affects) intermodulation distortion (IMD), the first transmission power control module 230 can perform power back-off as much as the preset value for the transmission power of the signal, which will be transmitted from the wireless communication chip having the lowest priority (or low priority) among the plurality of wireless communication chips 110 and 120.

In this case, the first transmission power control module 230 performs power back-off for the power of the signal to be transmitted from the wireless communication chip having low priority, so as to transmit the signal at the back-off power value. Meanwhile, the power value of the signal transmitted from the wireless communication chip having low priority can be maintained as it is.

For example, supposing that the second wireless communication chip 120 to which data based on the LTE wireless communication standard system are transmitted is the wireless communication chip having low priority, the first transmission power control module 230 can perform power back-off as much as the preset value for the transmission power of the signal, which will be transmitted from the second wireless communication chip 120. The power back-off value of the first transmission power control module 230 for the power of the signal to be transmitted from the wireless communication chip having low priority by IMD (or IM3) effect can be determined previously through a predetermined IMD table.

The sensing module 240 determines whether the user equipment 100 has approached near the ear of the user at a preset distance or less, to identify SAR effect. At this time, the sensing module 240 determines whether the user equipment 100 has approached near the ear of the user at a preset distance or less, based on whether a hands free function is currently enabled in the user equipment 100 or a speaker phone, Bluetooth acoustic device, or earphone is used by the user equipment 100.

If the hands free function is not enabled in the user equipment 100, or if a speaker phone, Bluetooth acoustic device, or earphone is used by the user equipment 100, the sensing module 240 can determine that the user equipment 100 has approached near the ear of the user at a preset distance or less. Alternatively, the sensing module 240 may determine whether the user equipment 100 has approached near the ear of the user at a preset distance or less, based on distance information measured between the user equipment 100 and the user through proximity sensing. In this case, the preset distance may be a threshold value that satisfies the SAR rule.

If the sensing module 240 determines that the user equipment 100 has approached near the ear of the user at a preset distance or less, the SAR condition decision module 250 can determine whether the transmission power values of the signals simultaneously transmitted from the plurality of wireless communication chips 110 and 120 after power back-off performed by the first transmission power control module 230 satisfy the SAR condition which is predefined.

If the SAR condition decision module 250 determines that the transmission power values of the signals simultaneously transmitted from the plurality of wireless communication chips 110 and 120 after power back-off performed by the first transmission power control module 230 do not satisfy the SAR condition which is predefined, the second transmission power control module 260 can perform power back-off for the transmission power value of the signal, which will be transmitted from the wireless communication chip (for example, the second wireless communication chip 120) having the lowest priority (or low priority) among the plurality of wireless communication chips 110 and 120, thereby satisfying the SAR condition.

In this case, the second transmission power control module 260 performs power back-off for the power of the signal to be transmitted from the wireless communication chip having low priority, so as to transmit the signal at the back-off power value. Meanwhile, the power value of the signal transmitted from the wireless communication chip having low priority can be maintained as it is, wherein the power value may be a power value determined after power back-off performed by the first transmission power control module 230 due to IMD effect.

The following Table 1 illustrates an example of a transmission power value of the signal from the second wireless communication chip 120 having low priority in accordance with the transmission power value of the first wireless communication chip 110 to satisfy the SAR condition.

TABLE 1

| Example of transmission power value of first wireless communication chip (dBm) | Example of transmission power value of second wireless communication chip (dBm) | Back-off value for signal to be transmitted from second wireless communication chip (dBm) |
|---|---|---|
| 23 | 18 | 5 |
| 22 | 19 | 4 |
| 21 | 20 | 3 |
| 20 | 21 | 2 |
| 19 | 22 | 1 |
| 18 | 23 | 0 |

As illustrated in Table 1, the transmission power values of the signals, which satisfy the SAR condition and are transmitted from the first and second wireless communication chips 110, can be set previously. For example, if the maximum transmission power value of the first signal, which will be transmitted from the first wireless communication chip 110, is 23 dBm, the second transmission power control module 260 can determine the transmission power value of the signal as 18 dBm by performing power back-off for the transmission power value of the second signal, which will be transmitted from the second wireless communication chip 120. In other words, in this case, the second transmission power control module 260 determines the transmission power value of the signal as 18 dBm by performing back-off of 5 dBm from the maximum transmission power value of 23 dBm. Namely, the power back-off value is 5 dBm.

If the first wireless communication chip 110 and the second wireless communication chip 120 simultaneously transmit the signals, it is supposed that the first wireless communication chip 110 is the chip that transmits a signal based on the CDMA system and the second wireless communication chip 120 is the chip that transmits a signal based on the LTE system. In this case, the first wireless communication chip 110 mainly transmits an audio signal while the second wireless communication chip 120 mainly transmits a data signal. If the user equipment 100 transmits audio and data signals at the same time, since priority is generally given to wireless communication for the audio signal in view of transmission power, the second transmission power control module 260 can determine the transmission power value of the signal, which will be transmitted from the second wireless communication chip 120, in accordance with the power value of the first signal which will be transmitted from the first wireless communication chip 110.

The second transmission power control module 260 can determine the power back-off value for the power of the signal, which will be transmitted from the wireless communication chip (for example, second wireless communication chip 120) having low priority, as expressed by the value illustrated in Table 1, and can determined the transmission power value based on the back-off value.

If the SAR condition decision module 250 determines that the transmission power values of the signals simultaneously transmitted from the plurality of wireless communication chips 110 and 120 after power back-off of the first transmission power control module 230 satisfy the predefined SAR condition, the transmitting module 270 can simultaneously transmit the signals of the plurality of wireless communication chips 110 and 120 based on the power value determined in accordance with power back-off performed by the first transmission power control module 230.

If the second transmission power control module 260 performs power back-off for the transmission power value of the signal, which will be transmitted from the wireless communication chip (for example, second wireless communication chip 120) having low priority, to satisfy the SAR condition, the transmitting module 270 can simultaneously transmit the signals of the plurality of wireless communication chips 110 and 120 based on the power value determined in accordance with power back-off performed by the second transmission power control module 260.

Alternatively, the second transmission power control module 260 may control the maximum transmission power value of the plurality of wireless communication chips 110 and 120 by controlling the current transmission power status of the plurality of wireless communication chips 110 and 120.

Figure 3:
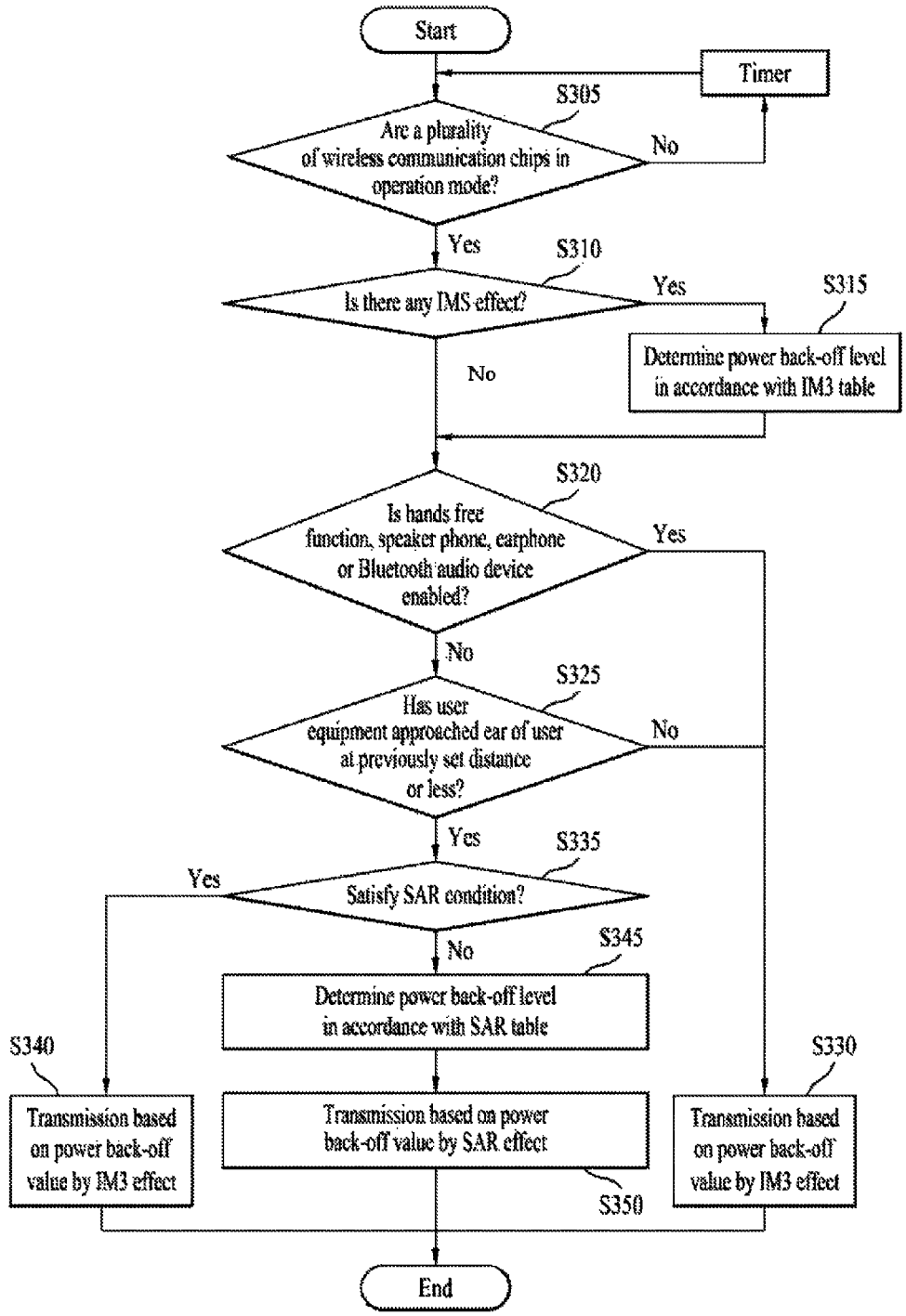
FIG. 3 is a flow chart illustrating a preferred procedure of a method for controlling transmission power at a user equipment 100 according to the present invention.

FIG. 3 is a flow chart illustrating a preferred procedure of a method for controlling transmission power at a user equipment 100 according to the present invention.

Referring to FIG. 3, the transmission mode decision module 210 determines whether the user equipment 100 is currently operated to transmit a signal through only one wireless communication chip (for example, first wireless communication chip 110) or simultaneously transmit signals, to which different wireless communication schemes are applied, through a plurality of wireless communication chips (for example, first and second wireless communication chips 110 and 120) (S305).

If it is determined that the transmission mode decision module 210 is operated to simultaneously transmit signals through a plurality of wireless communication chips 110 and 120, the intermodulation distortion effect decision module 220 determines whether frequencies of the signals respectively transmitted from the plurality of wireless communication chips affect intermodulation distortion (IMD) (S310).

If the intermodulation distortion effect decision module 220 determines that the frequencies of the signals respectively transmitted from the plurality of wireless communication chips affect intermodulation distortion (IMD) (S310), the first transmission power control module 230 performs power back-off as much as the value preset for the transmission power of the signal, which will be transmitted from the wireless communication chip having the lowest priority (or low priority), among the plurality of wireless communication chips (S320). At this time, the first transmission power control module 230 can perform power back-off for the signal, which will be transmitted from the wireless communication chip having the lowest priority (or low priority), by determining a power level for power back-off in accordance with an IMD (or IM3) table which is predetermined (S315). In other words, the first transmission power control module 230 determines the power value by applying power back-off to the power of the signal transmitted from the wireless communication chip having low priority.

The sensing module 240 determines whether the user equipment 100 has approached near the ear of the user at a preset distance or less, to identify SAR effect. At this time, the sensing module 240 determines whether the user equipment 100 has approached near the ear of the user at a preset distance or less, based on whether a hands free function is currently enabled in the user equipment 100 or a speaker phone, Bluetooth acoustic device, or earphone is used by the user equipment 100 (S320).

If the hands free function is not enabled in the user equipment 100, or if a speaker phone, Bluetooth acoustic device, or earphone is used by the user equipment 100, the sensing module 240 can determine that the user equipment 100 has approached near the ear of the user at a preset distance or less (S320). Alternatively, the sensing module 240 may determine whether the user equipment 100 has approached near the ear of the user at a preset distance or less, based on distance information measured between the user equipment 100 and the user through proximity sensing (S325). In this case, the preset distance may be a threshold value that satisfies the SAR rule.

If the sensing module 240 determines that the user equipment 100 has not approached near the ear of the user at a preset distance or less (S320, S325), the transmitting module 270 can simultaneously transmit the signals of the plurality of wireless communication chips by using the power value after power back-off for the signal, which will be transmitted from the wireless communication chip having the lowest priority (low priority) in accordance with the IMD (or IM3) table predetermined by the first transmission power control module 230 (S340).

Unlike the above case, if the sensing module 240 determines that the user equipment 100 has approached near the ear of the user at a preset distance or less (S325), the SAR condition decision module 250 can determine whether the transmission power values of the signals simultaneously transmitted from the plurality of wireless communication chips 110 and 120 after power back-off performed by the first transmission power control module 230 satisfy the SAR condition which is predefined (S335).

If the SAR condition decision module 250 determines that the transmission power values of the signals simultaneously transmitted from the plurality of wireless communication chips 110 and 120 after power back-off performed by the first transmission power control module 230 do not satisfy the SAR condition which is predefined, the second transmission power control module 260 can perform power back-off for the transmission power value of the signal, which will be transmitted from the wireless communication chip (for example, the second wireless communication chip 120) having the lowest priority of the plurality of wireless communication chips 110 and 120, thereby satisfying the SAR condition (S345).

However, if the SAR condition decision module 250 determines that the transmission power value satisfies the SAR condition, the transmitting module 270 can simultaneously transmit the signals of the plurality of wireless communication chips by using the power value after power back-off for the signal, which will be transmitted from the wireless communication chip having the lowest priority in accordance with the IMD (or IM3) table predetermined by the first transmission power control module 230 (S350).

Afterwards, as the user equipment 100 calculates extra power that can be transmitted, if a power headroom (PH) is triggered, the user equipment 100 can transmit a power headroom report to the base station. As one example of controlling the maximum transmission power, a method for performing a power headroom report based on immediate transmission power control can be used.

Triggering of the power headroom will be described in brief based on the 3GPP LTE and LTE-A which is an example of the wireless communication standard system.

Generally, the user equipment can trigger (or generate) a power headroom report (PHR) when an event occurs as follows:

(1) when a timer prohibitPHR-Timer, which prohibits the power headroom report (PHR), is stopped, and change in transmission path loss of the user equipment is greater than a preset value DL_PathlossChange; and (2) when a periodic report timer PeriodicPHR-Timer expires, which is referred to as a periodic power headroom report (PHR). After the power headroom report occurs, if the user equipment has a newly transmitted uplink transmission resource distributed from the base station for the current transmission time interval, it generates a corresponding power headroom report control element from a power headroom value acquired from the physical layer and re-drives the timer prohibitPHR-Timer.

In addition, if a periodic power boundary headroom report occurs, the user equipment re-drives the periodic report timer PeriodicPHR-Timer. For the detailed operation of the power headroom report process, refer to the related technical standard (3GPP TS 36.321, 36.213, 36.133).

It has been described that the user equipment 100 simultaneously transmits the signals through two different wireless communication chips. However, if the user equipment is configured by one wireless communication chip, like the user equipment that simultaneously transmits the signals through two different wireless communication chips, the user equipment performs power back-off for the corresponding wireless communication chip (or corresponding RAT) as no selection for the wireless communication chip (or RAT) is required.

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A user equipment apparatus comprising:
   a transmission mode decision module determining whether the user equipment apparatus is currently operated to transmit a signal through one wireless communication chip or to transmit a plurality of signals simultaneously through a first wireless communication chip and a second wireless communication chip;
   an intermodulation distortion (IMD) effect decision module determining whether a set of frequencies of the plurality of signals transmitted from the first and second wireless communication chips causes intermodulation distortion; and
   a first transmission power control module performing a first power back-off as much as a preset value for a transmission power of a signal to be transmitted from the second wireless communication chip having a lower priority than the first wireless communication chip when the IMD effect decision module determines that the set of frequencies causes intermodulation distortion,
   wherein the first transmission power control module performs the first power back-off by subtracting the preset value from a transmission power value of the signal to be transmitted from the second wireless communication chip.

2. The user equipment apparatus of claim 1, wherein a first wireless communication scheme applied to a signal transmitted from the first wireless communication chip is different from a second wireless communication scheme applied to the signal transmitted from the second wireless communication chip.

3. The user equipment apparatus of claim 2, wherein the first wireless communication scheme is a CDMA (Code Division Multiplexing Access) scheme and the second wireless communication scheme is an LTE (Long Term Evolution) scheme.

4. The user equipment apparatus of claim 1, further comprising a sensing module determining whether the user equipment apparatus is positioned at a distance that is equal to or less than a threshold distance with respect to an ear of a user.

5. The user equipment apparatus of claim 4, wherein the sensing module determines whether the user equipment apparatus is positioned at the distance that is equal to or less than the threshold distance with respect to the ear of the user based on whether a hands free function, a speaker phone, a Bluetooth™ acoustic device, or an earphone is currently used by the user equipment apparatus, or based on the distance between the user equipment apparatus and the user.

6. The user equipment apparatus of claim 5, further comprising a specific absorption rate (SAR) condition decision module determining whether a sum of transmission power values of the plurality of signals satisfies a SAR condition which is predefined when the sensing module determines that the user equipment apparatus is positioned at the distance that is equal to or less than the threshold distance with respect to the ear of the user,
   wherein the sum of the transmission power values of the plurality of signals is determined after performing the first power back-off by the first transmission power control module.

7. The user equipment apparatus of claim 6, further comprising a second transmission power control module performing a second power back-off for the transmission power value of the signal to be transmitted from the second wireless communication chip to satisfy the SAR condition, if the sum of the transmission power values does not satisfy the SAR condition.

8. The user equipment apparatus of claim 6, further comprising a transmitting module transmitting the plurality of signals simultaneously through the first and the second wireless communication chips.

9. The user equipment apparatus of claim 8, wherein:
   if the sum of the transmission power values satisfies the SAR condition, the transmitting module transmits the plurality of signals based on a transmission power value determined in accordance with the first power back-off performed by the first transmission power control module; and
   if the sum of the transmission power values does not satisfy the SAR condition, the transmitting module transmits the plurality of signals based on a transmission power value determined in accordance with the second power back-off performed by the second transmission power module.

10. A method for controlling a transmission power at a user equipment, the method comprising:
- determining a transmission mode as to whether the user equipment is currently operated to transmit a signal through one wireless communication chip or to transmit a plurality of signals simultaneously through a first wireless communication chip and a second wireless communication chip;
- determining whether a set of frequencies of the plurality of signals transmitted from the first and second wireless communication chips causes intermodulation distortion if the determined transmission mode is a mode that transmits the plurality of signals simultaneously through the first and second wireless communication chips; and
- performing a first power back-off as much as a preset value for a transmission power of a signal to be transmitted from the second wireless communication chip having a lower priority than the first wireless communication chip if the set of the frequencies causes intermodulation distortion;
- wherein the performing the first power back-off comprises subtracting the preset value from a transmission power value of the signal to be transmitted from the second wireless communication chip.

11. The method of claim 10, wherein a first wireless communication scheme applied to a signal transmitted from the first wireless communication chip is different from a second wireless communication scheme applied to the signal transmitted from the second wireless communication chip.

12. The method of claim 11, wherein the first wireless communication scheme is a CDMA (Code Division Multiplexing Access) scheme and the second wireless communication scheme is an LTE (Long Term Evolution) scheme.

13. The method of claim 10, further comprising sensing whether the user equipment apparatus is positioned at a distance that is equal to or less than a threshold distance with respect to an ear of a user.

14. The method of claim 13, wherein the sensing comprises determining whether the user equipment apparatus is positioned at the distance that is equal to or less than the threshold distance with respect to the ear of the user based on whether a hands free function, a speaker phone, a Bluetooth™ acoustic device, or an earphone is currently used by the user equipment apparatus, or based on the distance between the user equipment apparatus and the user.

15. The method of claim 14, further comprising determining whether a sum of transmission power values of the plurality of signals transmitted simultaneously from the first and second wireless communication chips satisfies a predefined specific absorption rate (SAR) condition when the user equipment apparatus is positioned at the distance that is equal to or less than the threshold distance with respect to the ear of the user.

16. The method of claim 15, further comprising a second transmission power controlling for performing a second power back-off for the transmission power value of the signal to be transmitted from the second wireless communication chip to satisfy the SAR condition, if the sum of the transmission power values does not satisfy the SAR condition.

17. The method of claim 15, further comprising transmitting the plurality of signals simultaneously through the first and the second wireless communication chips.

18. The method of claim 16, wherein:
- if the sum of the transmission power values satisfies the SAR condition, transmitting the plurality of signals is performed based on a transmission power value determined in accordance with the first power back-off; and
- if the sum of the transmission power values does not satisfy the SAR condition, transmitting the plurality of signals is performed based on a transmission power value determined in accordance with the second power back-off.

* * * * *